(12) United States Patent
Watanabe

(10) Patent No.: US 11,822,096 B2
(45) Date of Patent: Nov. 21, 2023

(54) OPTICAL SYSTEM AND OPTICAL APPARATUS

(71) Applicant: CANON KABUSHIKI KAISHA, Tokyo (JP)

(72) Inventor: Tatsuro Watanabe, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 17/081,010

(22) Filed: Oct. 27, 2020

(65) Prior Publication Data

US 2021/0141240 A1 May 13, 2021

(30) Foreign Application Priority Data

Nov. 7, 2019 (JP) ................................. 2019-202420

(51) Int. Cl.
*G02B 27/64* (2006.01)
*G02B 13/02* (2006.01)
*G02B 17/08* (2006.01)

(52) U.S. Cl.
CPC ........... *G02B 27/646* (2013.01); *G02B 13/02* (2013.01); *G02B 17/08* (2013.01)

(58) Field of Classification Search
CPC ...... G02B 27/646; G02B 13/02; G02B 17/08; G02B 9/12; G02B 17/0808; G02B 17/0856; G02B 17/0804; G02B 21/04; G02B 17/0844
USPC .................................................. 359/726–731
See application file for complete search history.

(56) References Cited

U.S. PATENT DOCUMENTS

| 5,331,467 A * | 7/1994 | Sato ..................... G02B 27/646 359/557 |
| 2016/0306149 A1* | 10/2016 | Eisenberg .............. H04N 5/332 |
| 2019/0219804 A1* | 7/2019 | Uchida .............. G02B 17/0884 |
| 2019/0265446 A1* | 8/2019 | Cho .................. G02B 17/0808 |
| 2019/0265449 A1* | 8/2019 | Cho .................. G02B 27/0025 |
| 2022/0308326 A1* | 9/2022 | Tomioka ............ G02B 17/0896 |

FOREIGN PATENT DOCUMENTS

| JP | H05-53058 A | 3/1993 |
| JP | H11-212132 A | 8/1999 |
| JP | 2014-74783 A | 4/2014 |
| JP | 2018-72457 A | 5/2018 |

(Continued)

OTHER PUBLICATIONS

Notice of Reasons for Rejection issued by the Japanese Patent Office dated Aug. 1, 2023 in corresponding JP Patent Application No. 2019-202420, with English translation.

*Primary Examiner* — Darryl J Collins
*Assistant Examiner* — Matthew Y Lee
(74) *Attorney, Agent, or Firm* — Carter, DeLuca & Farrell LLP

(57) ABSTRACT

An optical system includes a first optical element having a first reflective surface concave toward an object side, a second optical element having a second reflective surface convex toward an image side, and a lens unit disposed between the first optical element and the second optical element. Light from an object travels to an image plane through the first reflective surface and the second reflective surface in this order. A movable unit configured to move during image stabilizing includes at least one of the second optical element and the lens unit.

10 Claims, 15 Drawing Sheets

(56) References Cited

FOREIGN PATENT DOCUMENTS

| JP | 2018-091956 A | 6/2018 |
|---|---|---|
| JP | 2019-148791 A | 9/2019 |
| WO | 2018/066313 A1 | 4/2018 |

\* cited by examiner

OPTICAL SYSTEM AND OPTICAL APPARATUS

BACKGROUND OF THE INVENTION

Field of the Invention

The present invention relates to an optical system suitable for an imaging optical system in a camera, an interchangeable lens, and the like.

Description of the Related Art

One telephoto type imaging optical system having a long focal length is a catadioptric imaging optical system having a reflection system and a refraction system. The telephoto type imaging optical system often has an image stabilizing function for reducing (correcting) image blurs caused by vibrations such as camera shakes. Japanese Patent Laid-Open Nos. ("JPs") 2014-74783 and 05-53058 disclose catadioptric imaging optical systems each having an image stabilizing function of moving a movable unit during image stabilizing.

In general, it is necessary for a large image stabilizing amount (angle) to increase the moving amount of the movable unit or a ratio of the image moving amount to a unit moving amount of the image stabilizing unit, i.e., a correction sensitivity. However, if the moving amount of the movable unit is increased or the refractive power of the movable unit is increased in order to enhance the correction sensitivity, an eccentric (or decentering) aberration amount increases and an optical performance deteriorates. Further, in the imaging optical systems disclosed in JPs 2014-74783 and 05-53058, the movable unit has a low ray height of an axial light flux and a high position of an off-axis principal ray from the optical axis, and thus it has a low correction sensitivity and a large eccentric aberration amount during image stabilizing.

SUMMARY OF THE INVENTION

The present invention provides a compact optical system that can provide a large image stabilizing amount, and a good optical performance even during image stabilizing.

An optical system according to one aspect of the present invention a first optical element having a first reflective surface concave toward an object side, a second optical element having a second reflective surface convex toward an image side, and a lens unit disposed between the first optical element and the second optical element. Light from an object travels to an image plane through the first reflective surface and the second reflective surface in this order. A movable unit configured to move during image stabilizing includes at least one of the second optical element and the lens unit.

An optical apparatus having the above optical system also constitutes another aspect of the present invention.

Further features of the present invention will become apparent from the following description of exemplary embodiments with reference to the attached drawings.

DESCRIPTION OF THE EMBODIMENTS

Figure 1:
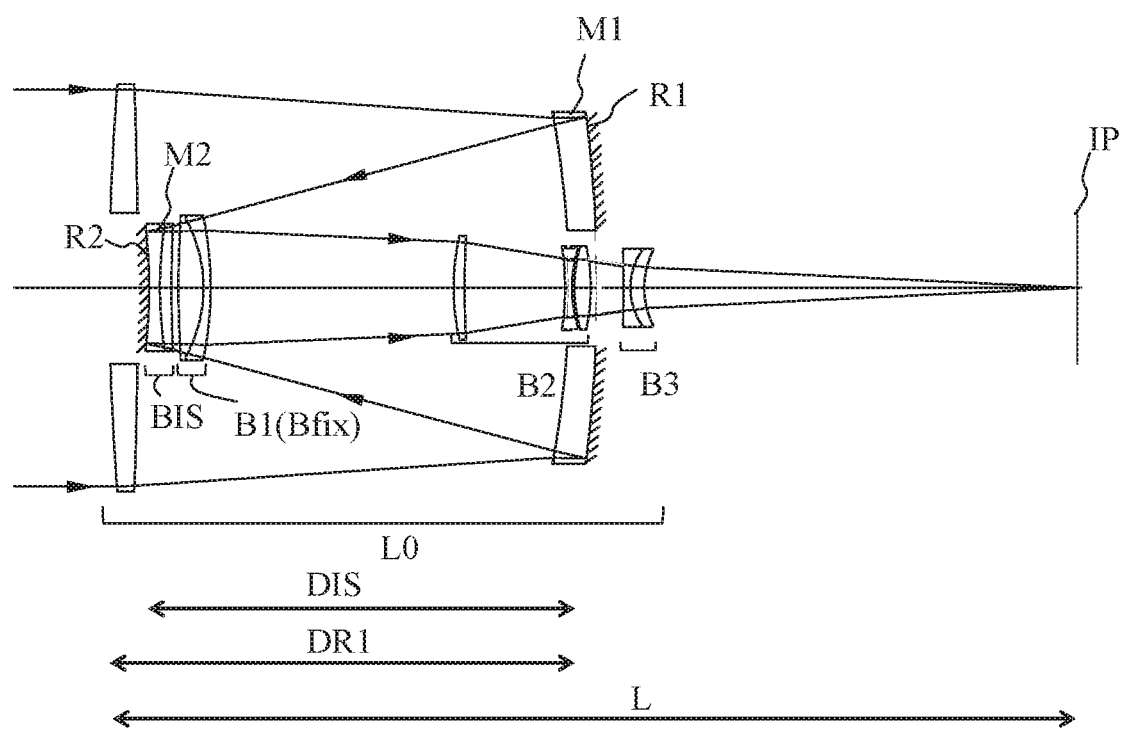
FIG. 1 is a sectional view of an optical system according to Example 1.
Figure 2:
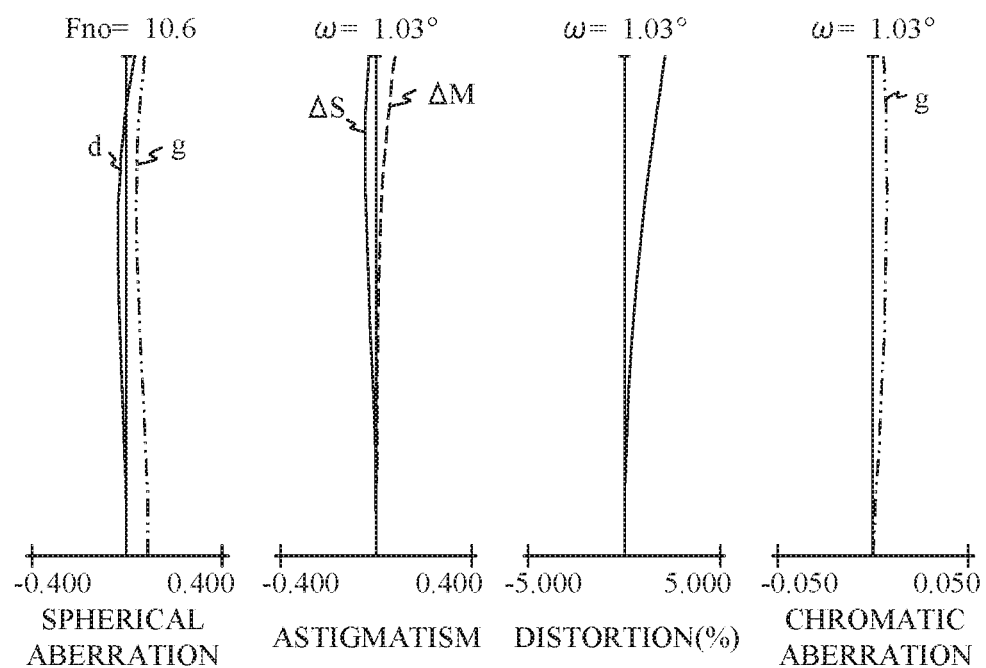
FIG. 2 is a longitudinal aberration diagram of the optical system (focused on an object at infinity) according to Example 1.
Figure 3:
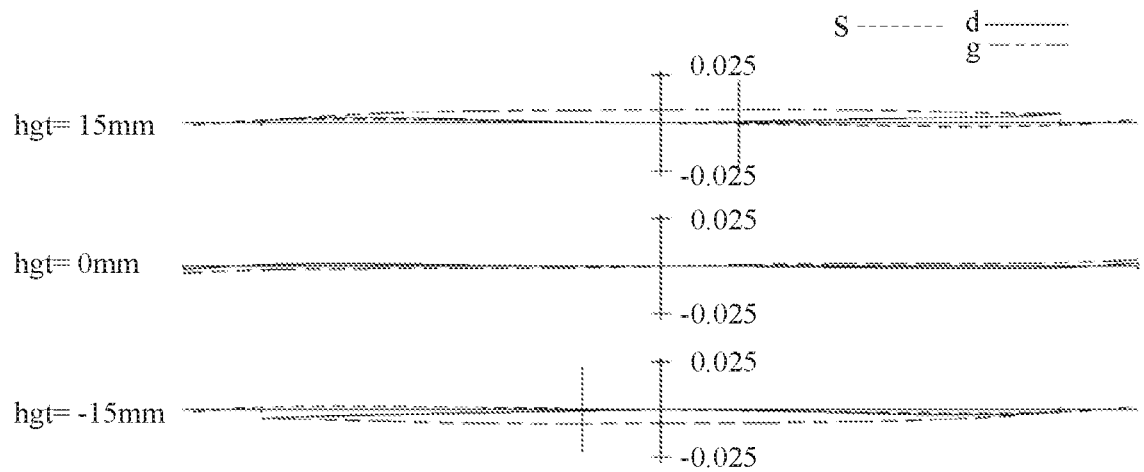
FIG. 3 is a lateral aberration diagram of the optical system (focused on the object at infinity) according to Example 1.
Figure 4:
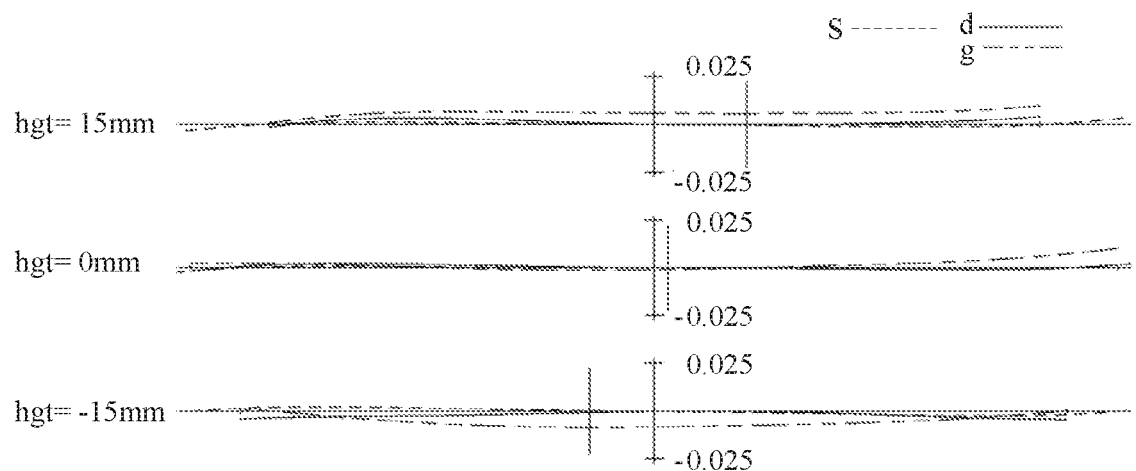
FIG. 4 is a lateral aberration diagram of the optical system (focused on the object at infinity and during image stabilizing at 0.3°) according to Example 1.
Figure 5:
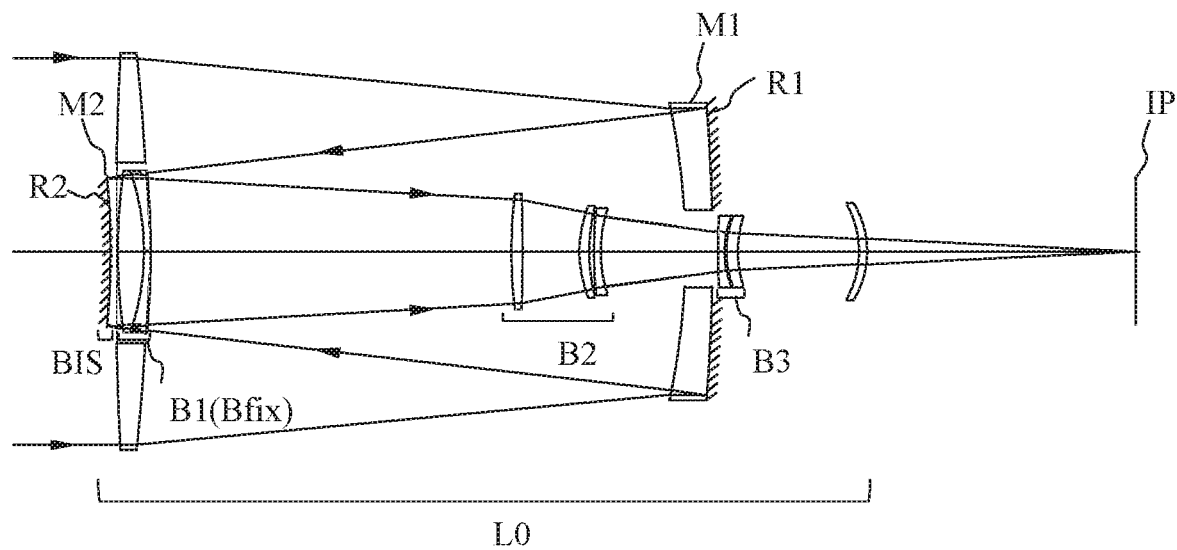
FIG. 5 is a sectional view of an optical system according to Example 2.
Figure 6:
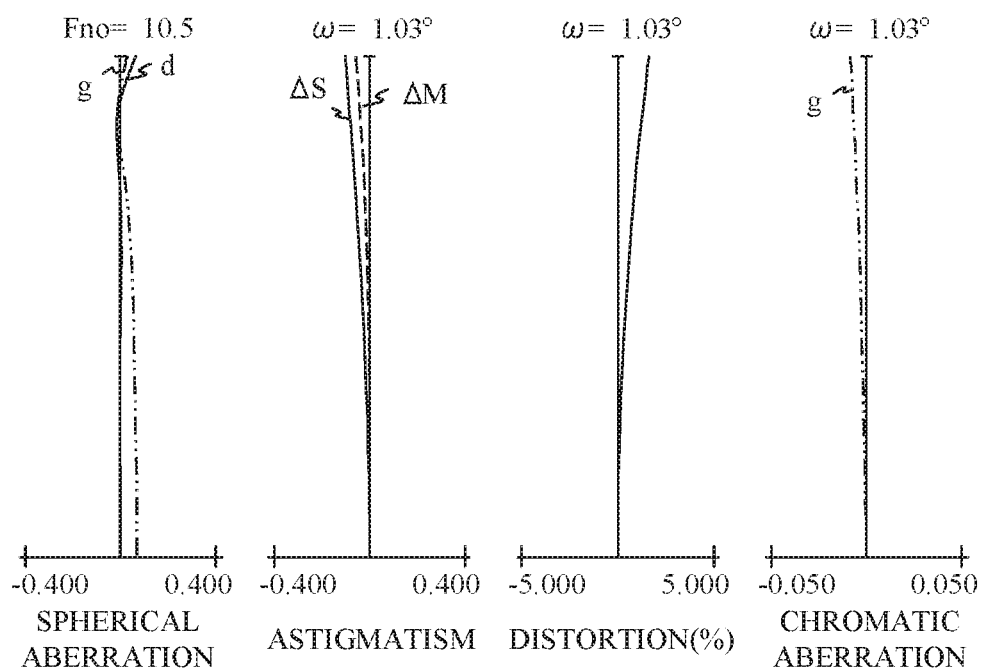
FIG. 6 is a longitudinal aberration diagram of the optical system (focused on an object at infinity) according to Example 2.
Figure 7:
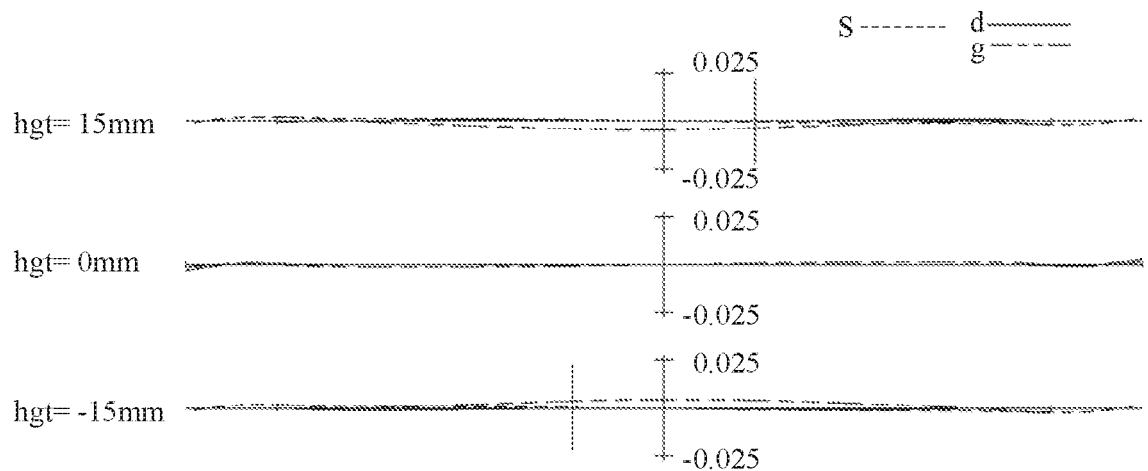
FIG. 7 is a lateral aberration diagram of the optical system (focused on the object at infinity) according to Example 2.
Figure 8:
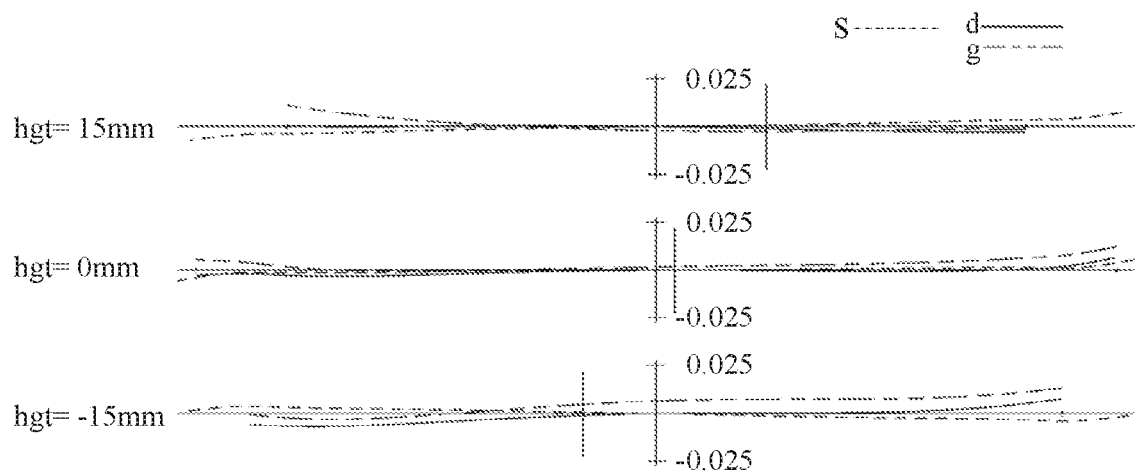
FIG. 8 is a lateral aberration diagram of the optical system (focused on the object at infinity and during image stabilizing at 0.3°) according to Example 2.
Figure 9:
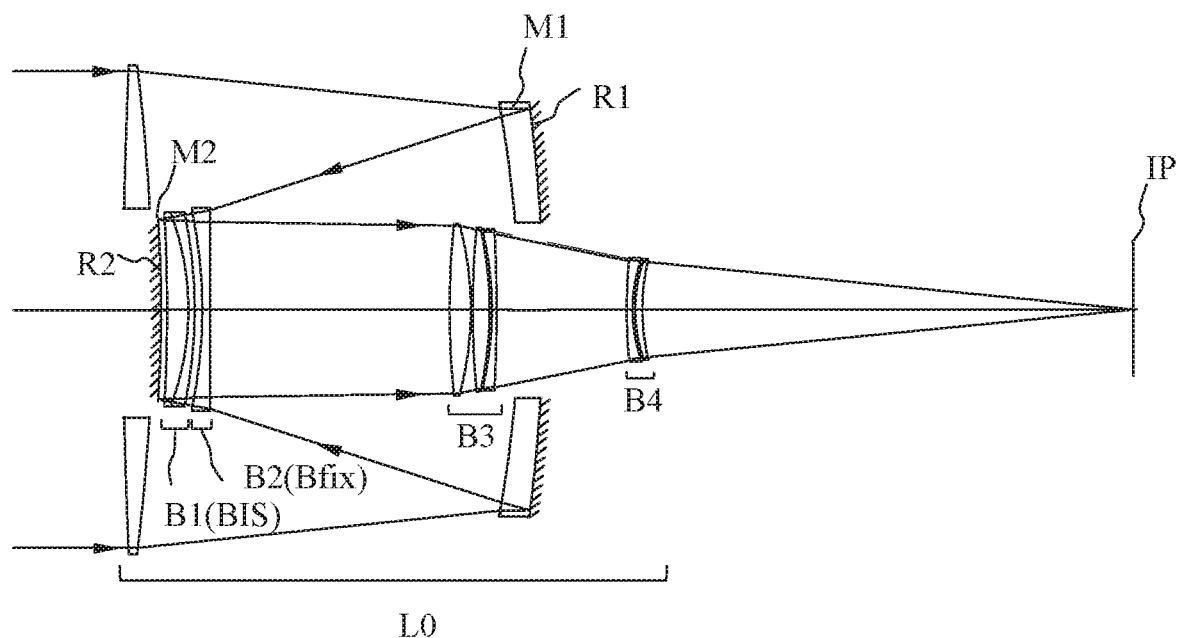
FIG. 9 is a sectional view of an optical system according to Example 3.
Figure 10:
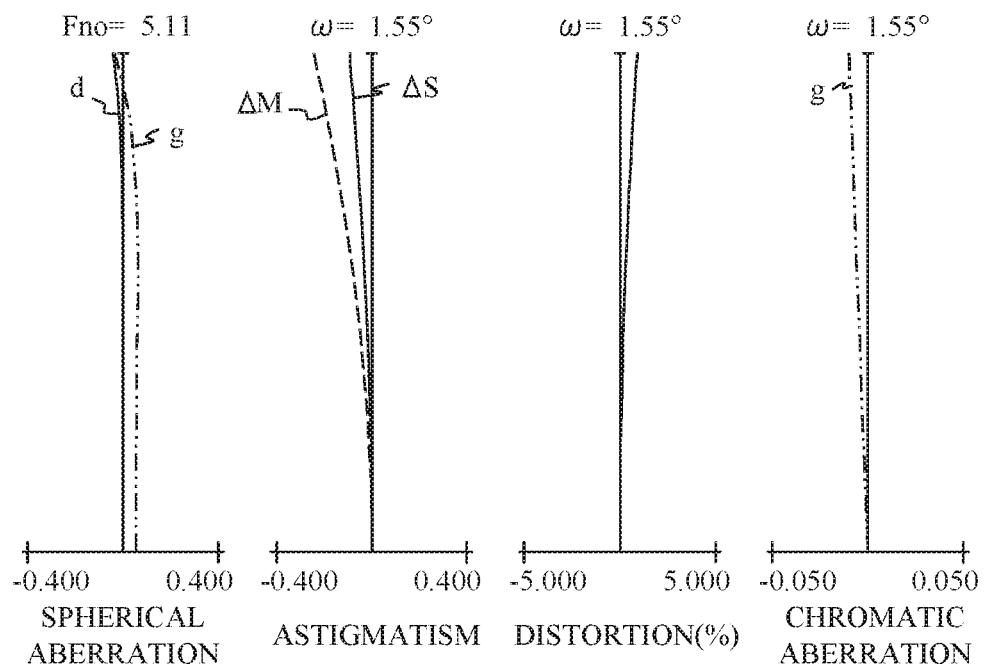
FIG. 10 is a longitudinal aberration diagram of the optical system (focused on an object at infinity) according to Example 3.
Figure 11:
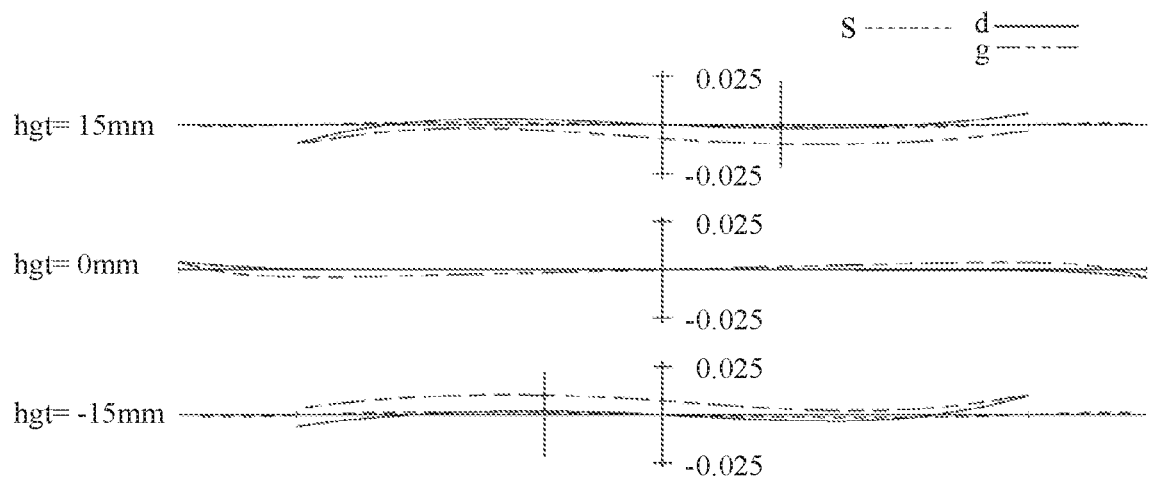
FIG. 11 is a lateral aberration diagram of the optical system (focused on the object at infinity) according to Example 3.
Figure 12:
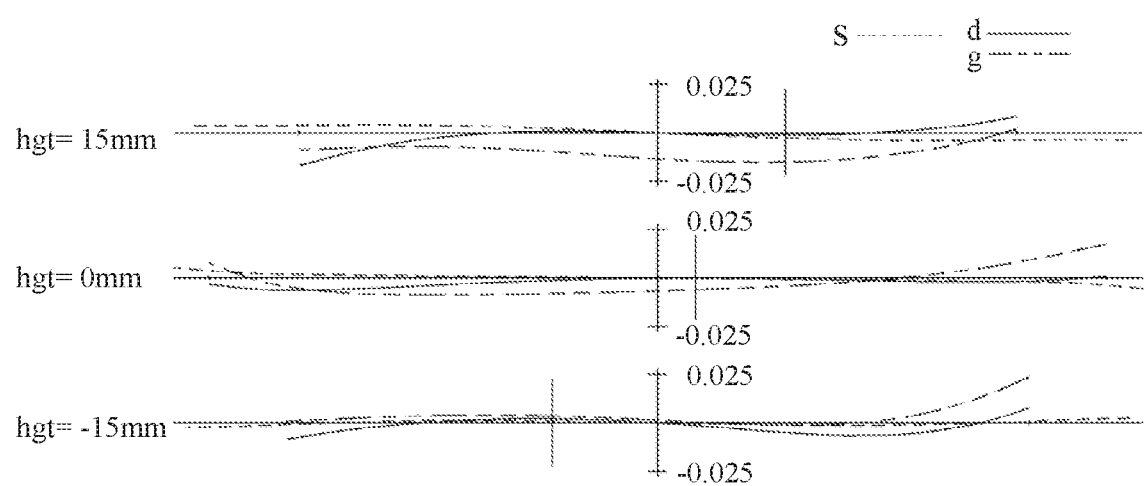
FIG. 12 is a lateral aberration diagram of the optical system (focused on the object at infinity and during image stabilizing at 0.3°) according to Example 3.
Figure 13:
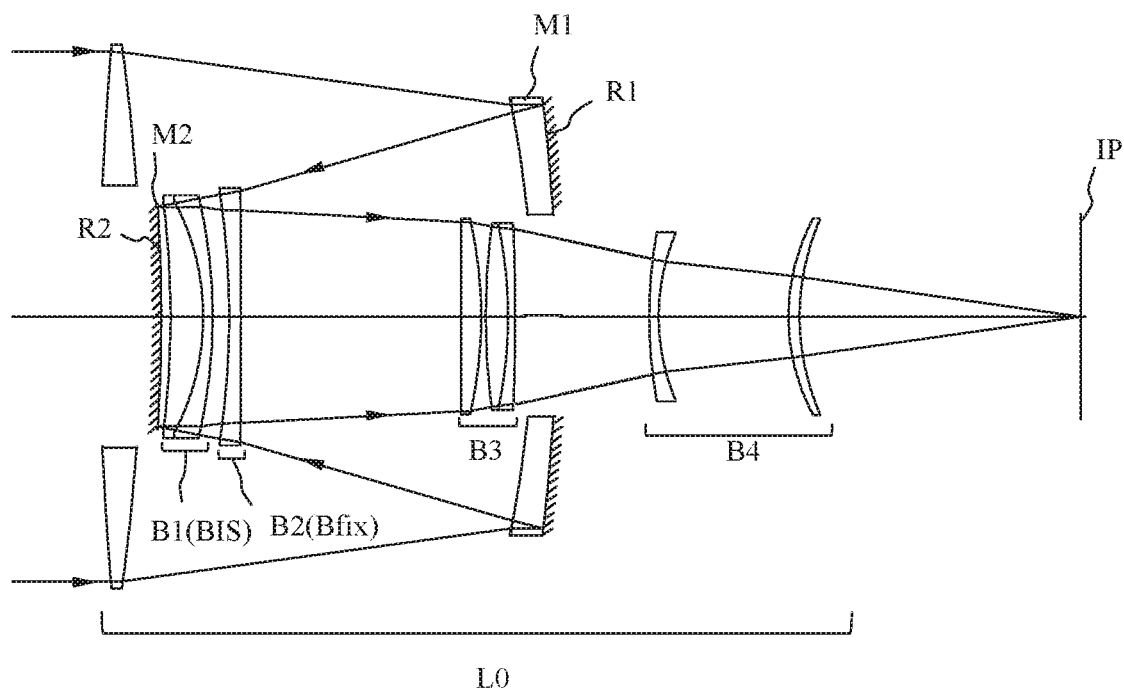
FIG. 13 is a sectional view of an optical system according to Example 4.
Figure 14:
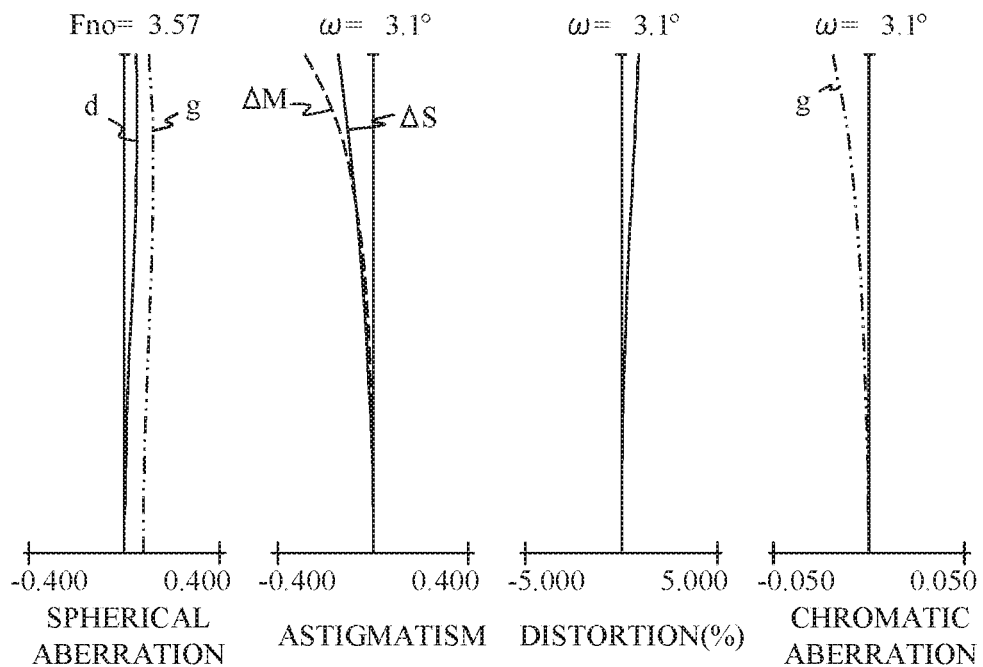
FIG. 14 is a longitudinal aberration diagram of the optical system (focused on an object at infinity) according to Example 4.
Figure 15:
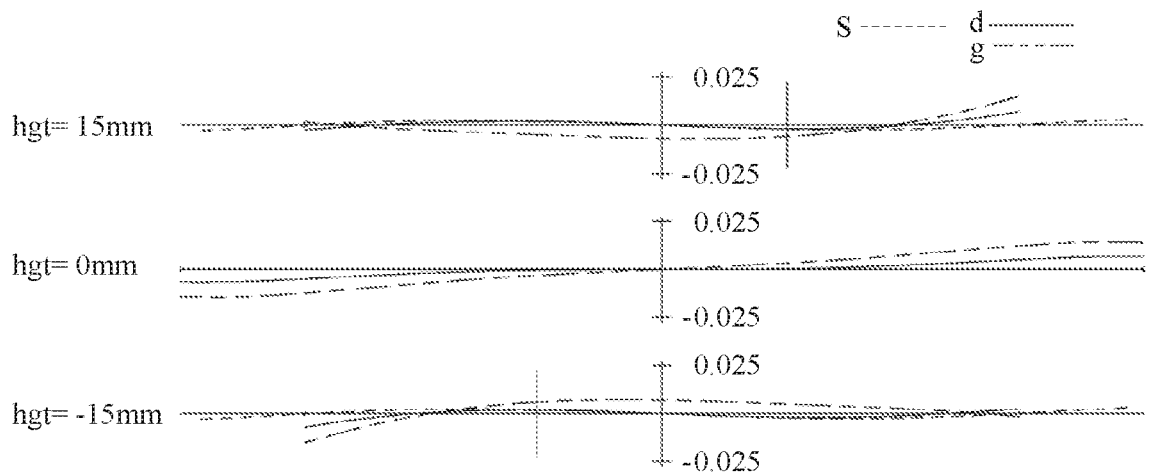
FIG. 15 is a lateral aberration diagram of the optical system (focused on the object at infinity) according to Example 4.
Figure 16:
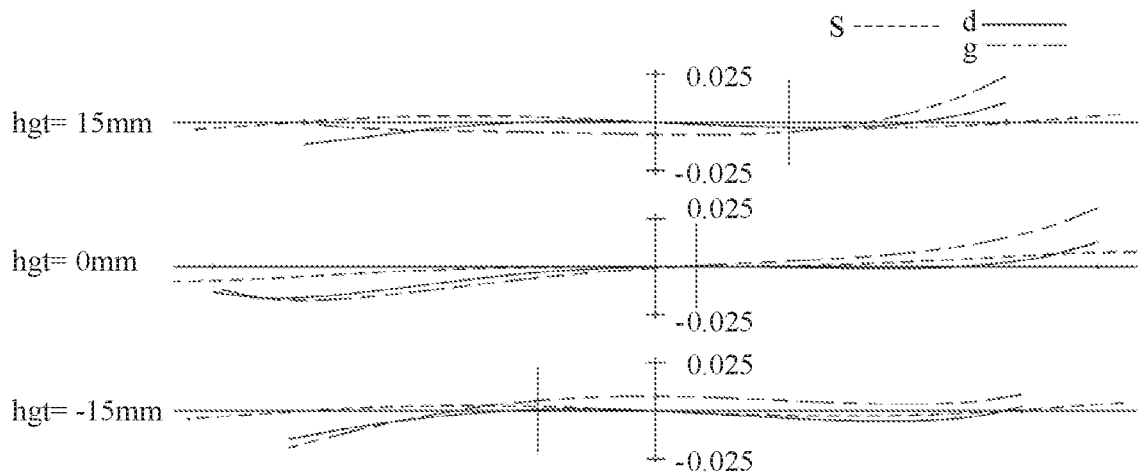
FIG. 16 is a lateral aberration diagram of the optical system (focused on the object at infinity and during image stabilizing at 0.3°) according to Example 4.
Figure 17:
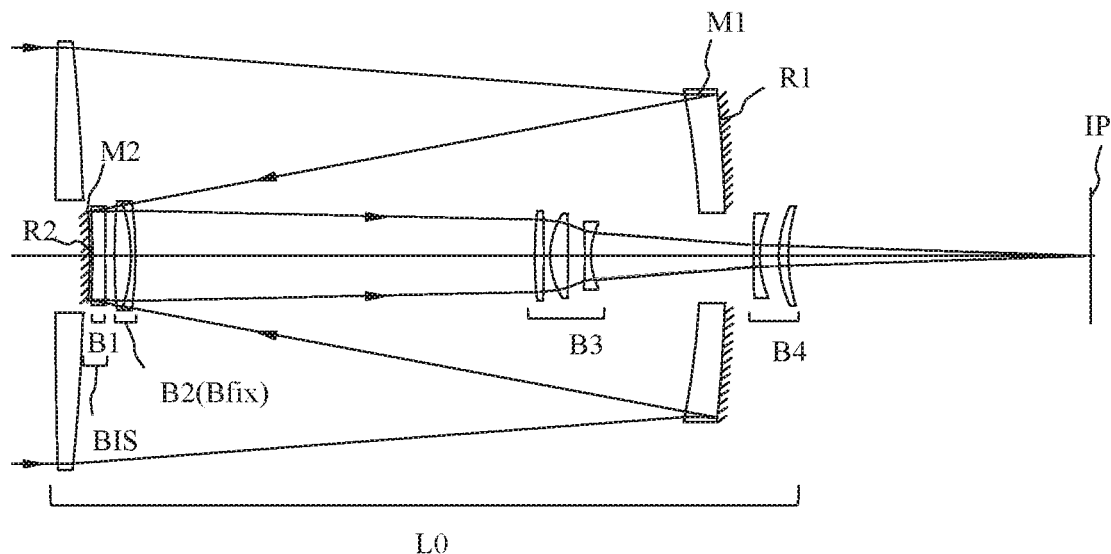
FIG. 17 is a sectional view of the optical system according to Example 5.
Figure 18:
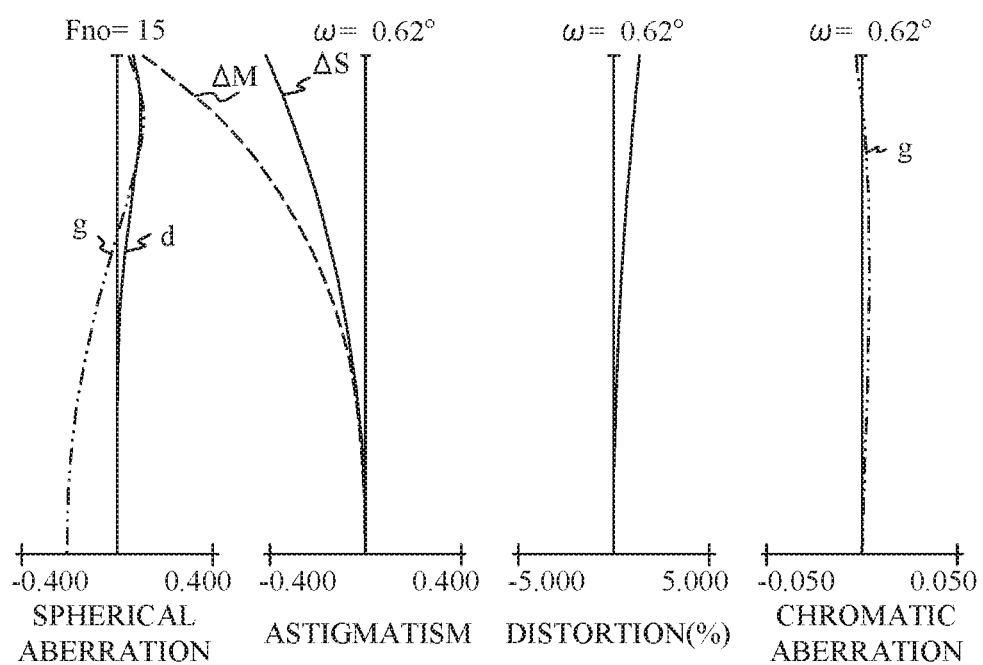
FIG. 18 is a longitudinal aberration diagram of the optical system (focused on an object at infinity) according to Example 5.
Figure 19:
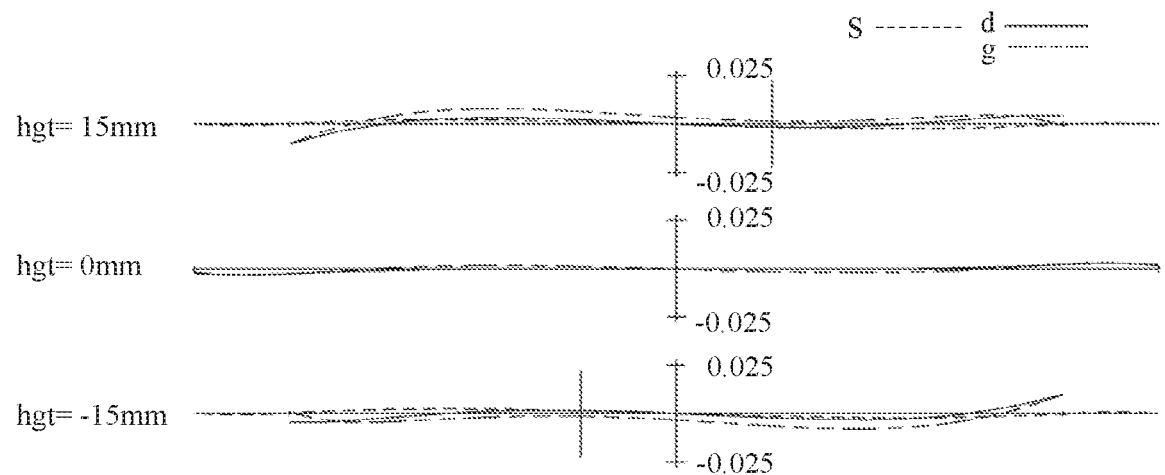
FIG. 19 is a lateral aberration diagram of the optical system (focused on the object at infinity) according to Example 5.
Figure 20:
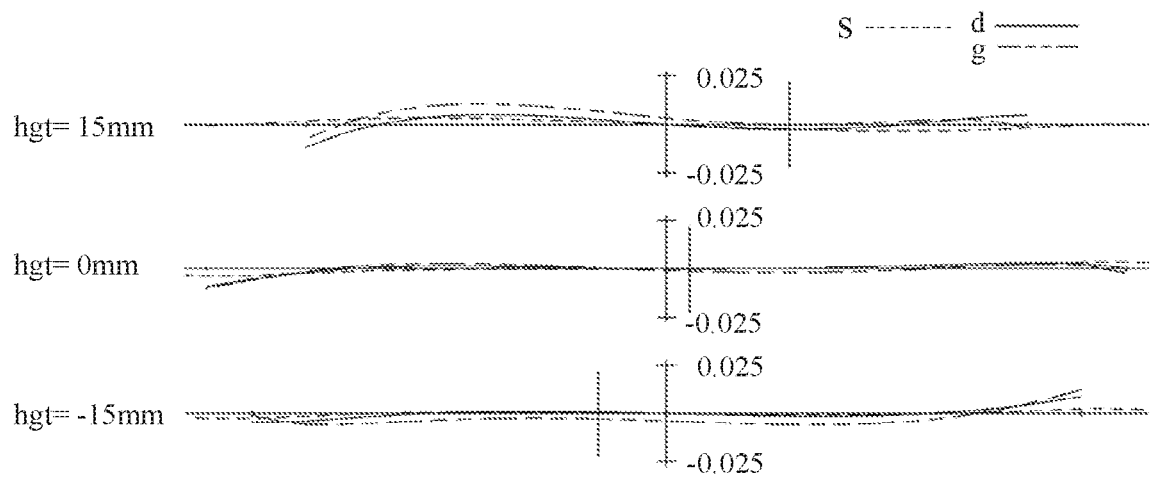
FIG. 20 is a lateral aberration diagram of the optical system (focused on the object at infinity and during image stabilizing at 0.3°) according to Example 5.
Figure 21:
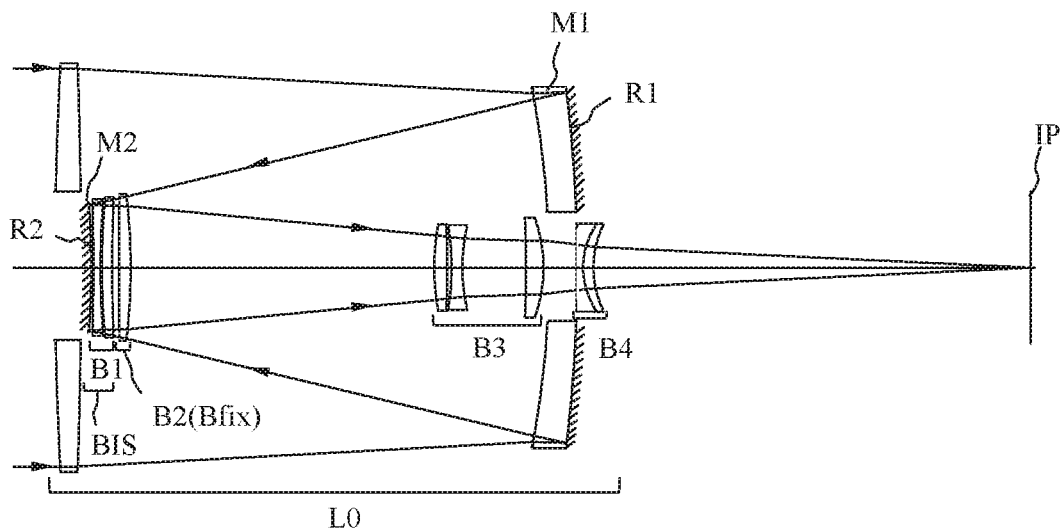
FIG. 21 is a sectional view of an optical system according to Example 6.
Figure 22:
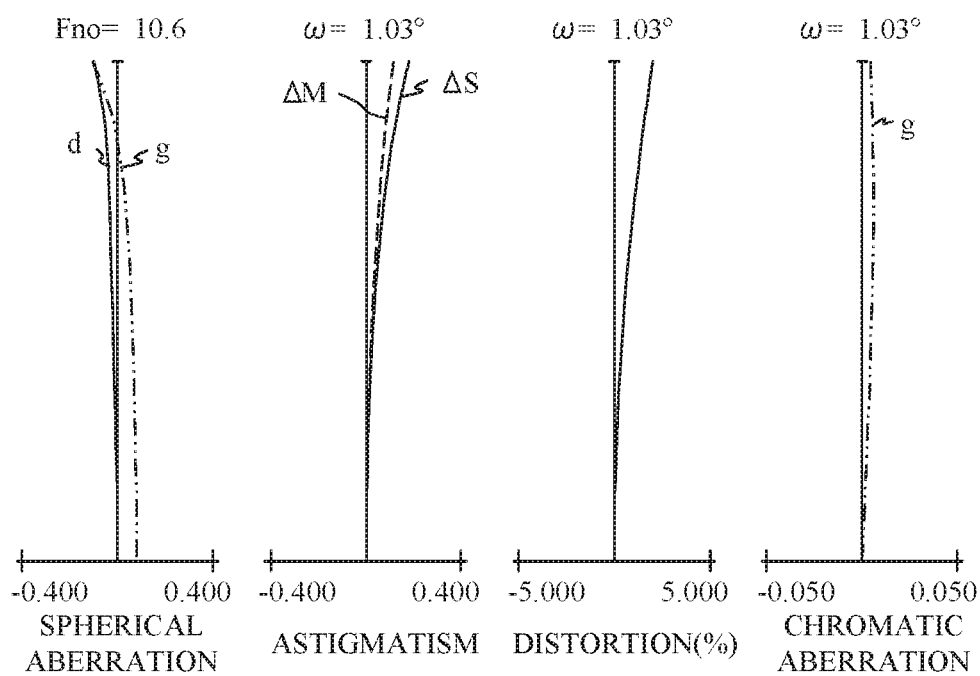
FIG. 22 is a longitudinal aberration diagram of the optical system (focused on an object at infinity) according to Example 6.
Figure 23:
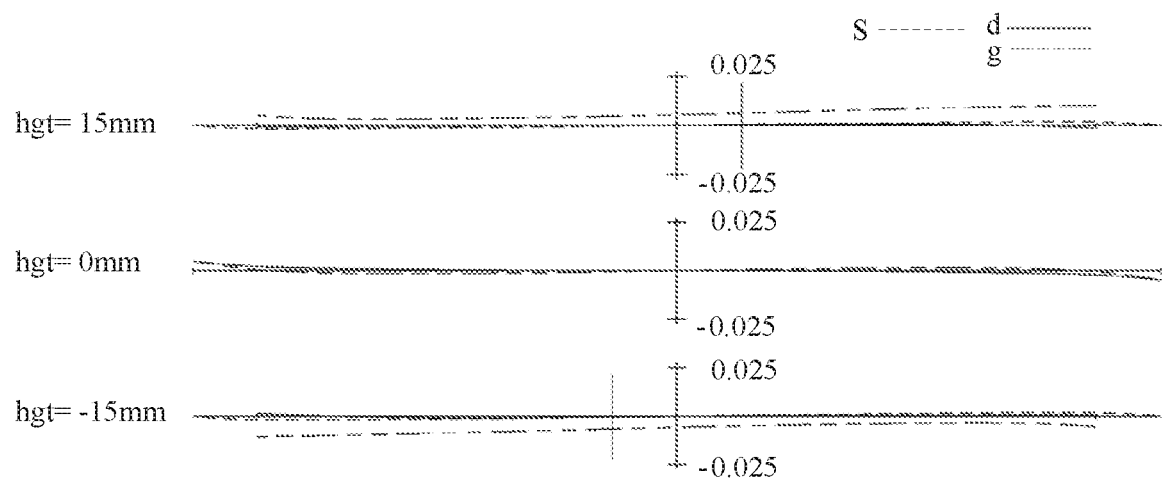
FIG. 23 is a lateral aberration diagram of the optical system (focused on the object at infinity) according to Example 6.
Figure 24:
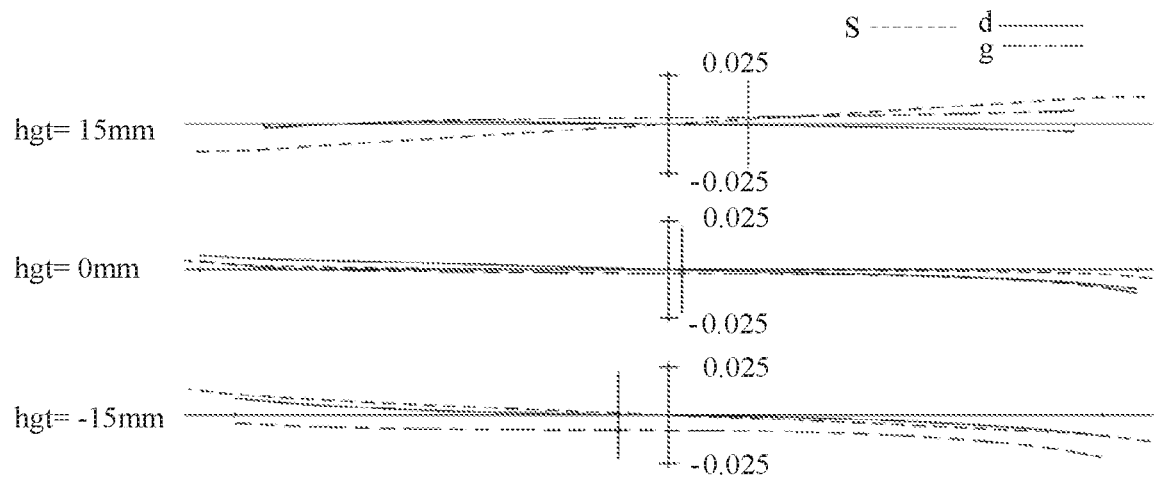
FIG. 24 is a lateral aberration diagram of the optical system (focused on the object at infinity and during image stabilizing at 0.3°) according to Example 6.
Figure 25:
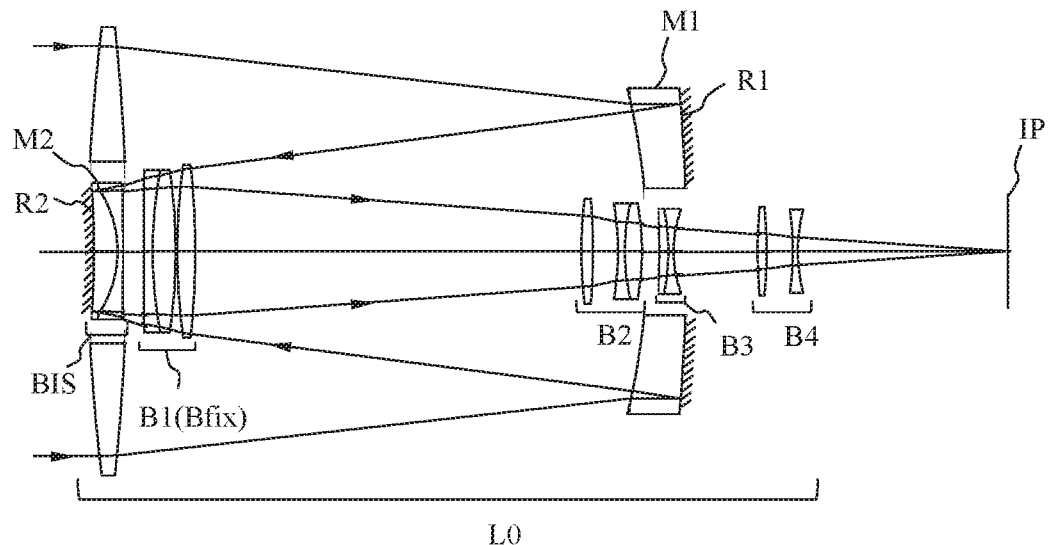
FIG. 25 is a sectional view of an optical system according to Example 7.
Figure 26:
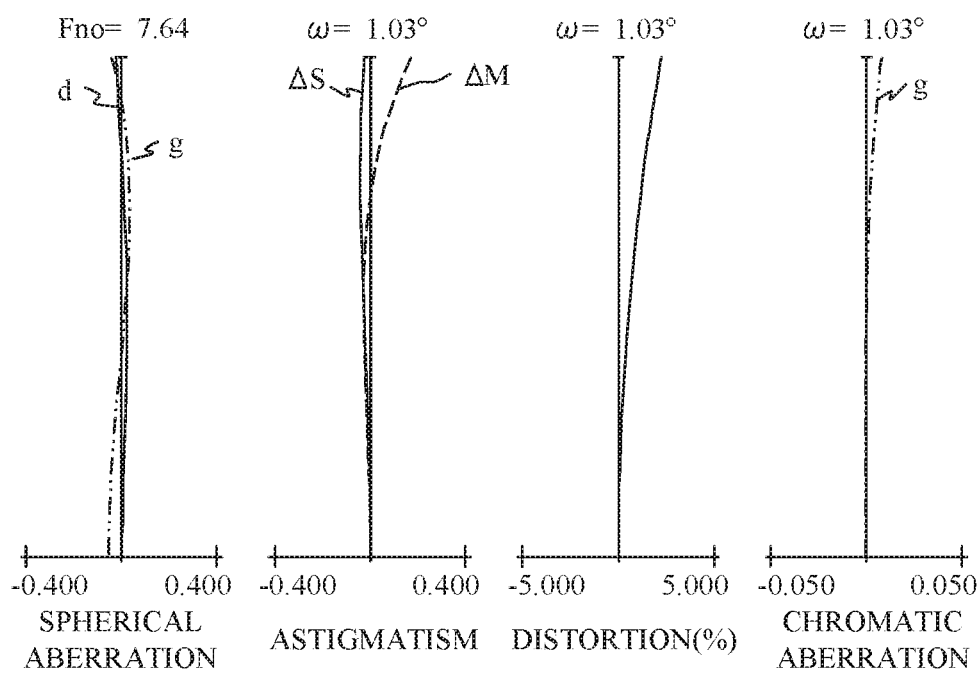
FIG. 26 is a longitudinal aberration diagram of the optical system (focused on an object at infinity) according to Example 7.
Figure 27:
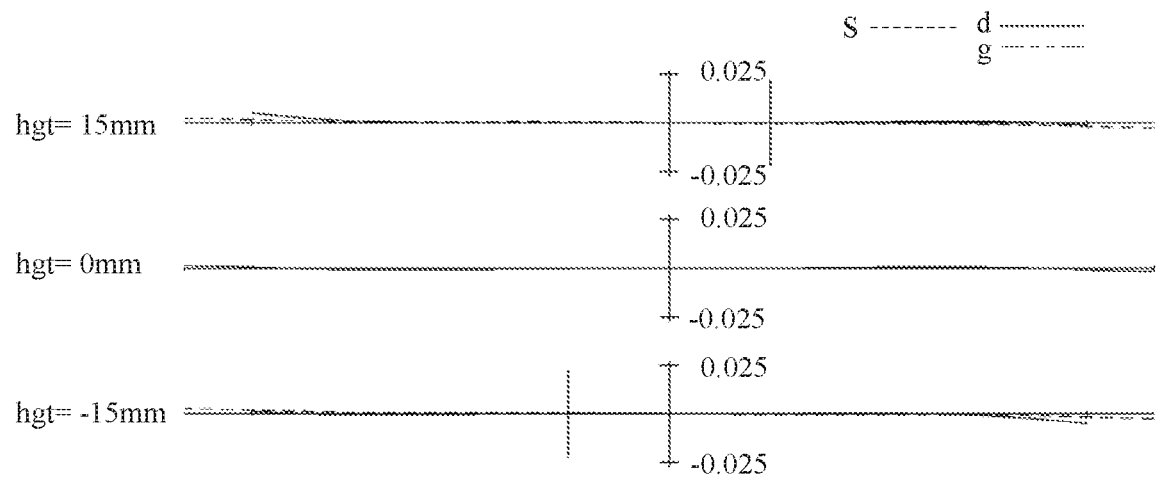
FIG. 27 is a lateral aberration diagram of the optical system (focused on the object at infinity) according to Example 7.
Figure 28:
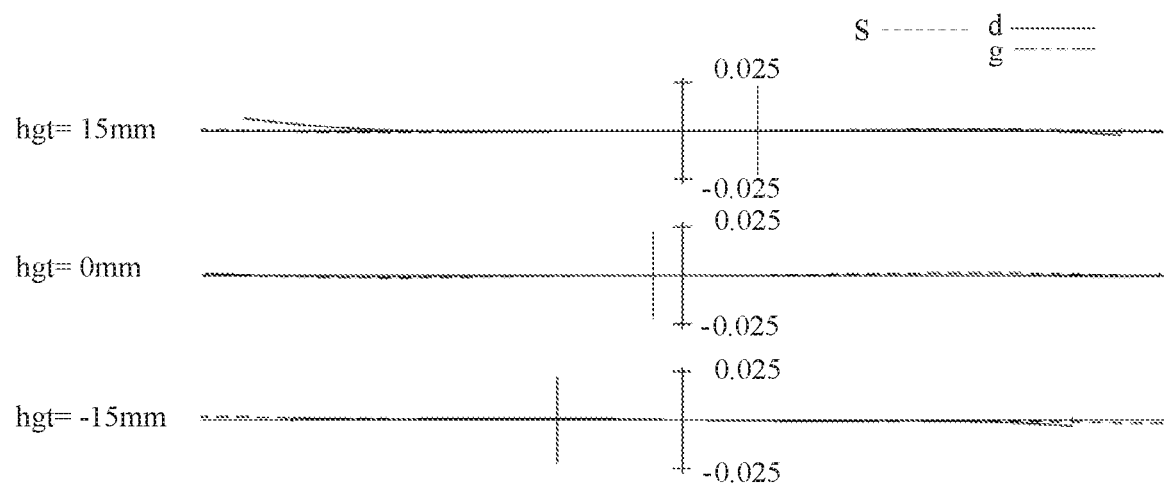
FIG. 28 is a lateral aberration diagram of the optical system (focused on the object at infinity and during image stabilizing at 0.3°) according to Example 7.

Referring now to the accompanying drawings, a description will be given of examples according to the present invention, FIGS. 1, 5, 9, 13, 17, 21, and 25 respectively illustrate a sectional view of a catadioptric optical system (simply referred to as an optical system hereinafter) L0 according to each of Examples 1 to 7 of the present invention in an in-focus state on (an object at) infinity. FIGS. 2, 6, 10, 14, 18, 22, and 26 are longitudinal aberration diagrams of the optical system L0 according to each of Examples 1 to 7. FIGS. 3, 7, 11, 15, 19, 23, and 27 are lateral aberration diagrams of the optical systems L0 according to each of Examples 1 to 7. FIGS. 4, 8, 12, 16, 20, 24, and 28 are lateral aberration diagrams during image stabilizing of the optical systems L0 according to each of Examples 1 to 7. The optical system L0 according to each example is suitable for an imaging optical system used in an image pickup apparatus such as a digital video camera, a digital still camera, a broadcasting camera, a film-based camera, and a surveillance camera.

In the sectional views of the optical system L0 according to each example, the left side represents the object side and the right side represents the image side. The optical system L0 according to each example includes a plurality of lens units, which include at least one lens unit that is fixed during image stabilizing and at least one lens unit that moves during image stabilizing. The lens unit may include an aperture stop (diaphragm).

The optical system L0 according to each example includes a first optical element M1 having a first reflective surface R1 concave toward an object side, and a second optical element M2 having a second reflective surface R2 that is convex on an image side, reflects light from the object in the order of the first reflective surface R1 and the second reflective surface R2, and then forms an image. IP represents the image plane. When the optical system L0 according to each example is used for an imaging optical system in an image pickup apparatus, an imaging plane of an image sensor (photoelectric conversion element), such as a CCD sensor or a CMOS sensor, and a film plane of a film-based surface are disposed on the image plane IP.

In a spherical aberration diagram of the longitudinal aberration diagram, Fno represents an F-number, a solid line represents a spherical aberration for the d-line (wavelength 587.6 nm), and an alternate long and two short dashes line represents a spherical aberration for the g-line (wavelength 435.8 nm). In an astigmatism diagram, a solid line ΔS represents a curvature of field amount of a sagittal image plane, and a broken line ΔM represents a curvature of field amount of a meridional image plane. The distortion is one for the d-fine. A chromatic aberration diagram illustrates a lateral chromatic aberration for the g-line. ω is a half angle of view (°) calculated by paraxial calculations.

The lateral aberration diagram illustrates a lateral aberration amount of a meridional plane for the d-line (wavelength 587.56 nm) and the g-line (wavelength 435.8 nm). S represents a lateral aberration amount of a sagittal plane for the d-line (wavelength 587.56 nm), hgt represents an image height (mm).

Next follows a description of a configuration common to the optical systems L0 of respective examples. As described above, the optical system L0 according to each example forms an image of light from the object after reflecting the light in order of a first reflective surface R1 (first optical element M1) having a concave surface facing the object side and a second reflective surface R2 (the second optical element M2) having a convex surface facing the image side.

The optical system L0 further includes a lens unit B1 disposed at a position where the light reflected by the second reflective surface R2 and traveling to the image plane passes and located closer to the second optical element than the first optical element M1 (object side: between the first optical element and the second optical element). An image stabilizing unit BIS serves as a movable unit that moves during image stabilizing, more specifically moves parallel to the direction orthogonal to the optical axis, rotates in an arc shape around a point on the optical axis, or rotates (or tilts) relative to the optical axis, and includes at least one of the second optical element M2 and the lens unit B1.

In order to obtain a large image stabilizing amount (referred to as an image stabilizing angle hereinafter) even though the optical system L0 is entirely compact and to maintain a good optical performance during image stabilizing, it is necessary for this optical system L0 to properly set the configuration of the entire optical system including the image stabilizing unit. In order to increase the image stabilizing angle, it is effective to dispose the image stabilizing unit at a position where the ray height of the axial light beam is high in the optical system L0. In order to maintain a good optical performance during image stabilizing, the image stabilizing unit may be disposed at a position in the optical system L0 where the height of the off-axis principal ray from the optical axis is low. In particular, it is effective in reducing eccentric coma and eccentric astigmatism amounts generated during image stabilizing.

When the image stabilizing unit is disposed on the image side of the first optical element M1, the image stabilizing unit is disposed at a position where the ray height of the axial light beam is low and the height of the off-axis principal ray from the optical axis is high. Therefore, it is difficult to obtain a sufficiently high image stabilizing sensitivity, and an eccentric aberration amount generated during image stabilizing also becomes large. Thus, the number of lenses increases for a higher image stabilization angle or a reduced eccentric aberration during image stabilizing, a mechanism for driving the image stabilizing unit becomes large, and consequently the imaging optical system becomes large.

The image stabilizing unit BIS in the optical system L0 according to each example includes at least one of the second optical element M2 having the second reflective surface R2, and the lens unit B1, as described above. In particular, since a chromatic aberration generally does not occur on the reflective surface, when the second optical element M2 is included in the image stabilizing unit BIS, the eccentric chromatic aberration that would otherwise occur during image stabilizing can be reduced. The same effect can be obtained regardless of whether the image stabilizing unit BIS includes the second optical element M2 or the lens unit B1. Since the optical system L0 has the lens unit B1, the entire system can be made compact while various aberrations can be corrected which would otherwise occur in the first optical element M1 and the second optical element.

In order to make the entire system compact, it is effective to increase the power of each of the first reflective surface R1 and the second reflective surface R2. At this time, when the absolute value of the power of the second reflective surface R2 becomes larger than the power of the first reflective surface R1, the Petzval sum of the entire system and consequently the curvature of field are likely to turn into the plus side. Hence, at least one of the image stabilizing unit BIS and the fixed lens unit Bfix includes a negative lens. Thereby, the Petzval sum of the first reflective surface R1 and the second reflective surface R2 can be corrected by the negative lens, and the curvature of field can be easily reduced.

The image stabilizing unit BIS includes a positive lens. This facilitates achromatization of the image stabilizing unit BIS and facilitates a reduction of the eccentric chromatic aberration that would otherwise occur during image stabilizing. The image stabilizing unit BIS and the fixed lens unit Bfix may be combined and configured with three lenses. Thereby, it becomes easy to suppress the eccentric aberration during image stabilizing, especially the eccentric curvature of field and eccentric coma.

The image stabilizing unit BIS is disposed so that a ray traveling from the first reflective surface R1 to the second reflective surface R2 and a ray traveling from the second reflective surface R2 to the image side pass through the image stabilizing unit BIS. Thereby, it becomes easy to increase the image stabilizing sensitivity, and a large image stabilizing angle can be obtained.

The fixed lens unit Bfix is disposed such that a ray traveling from the first reflective surface R1 to the second reflective surface R2 and a ray traveling from the second reflective surface R2 to the image side pass through the fixed lens unit Bfix. Thereby, the aberrations of the ray incident on the image stabilizing unit BIS and the ray emitted from the image stabilizing unit BIS can be corrected by the fixed lens unit Bfix. In particular, in order to suppress the eccentric aberration that would otherwise occur during image stabilizing, the configurations of the image stabilizing unit BIS and the lens unit disposed on the object side of it are important, and therefore the fixed lens unit Bfix can enhance the effect of correcting the eccentric curvature of field that would otherwise occur during image stabilizing.

Each of the effective diameters of all optical elements and lenses that constitute the image stabilizing unit BIS and the fixed lens unit Bfix is smaller than the effective diameter of the first reflective surface R1. Thereby, the image stabilizing unit BIS, the fixed lens unit Bfix, and the entire system can be effectively made compact.

Next follows a more specific configuration according to each example. The optical system L0 according to each of Example 1 (FIG. 1) and Example 2 (FIG. 5) includes a first optical element M1, a second optical element M2, and a lens unit B1. The image stabilizing unit BIS includes the second optical element M2, and moves in a direction orthogonal to the optical axis during image stabilizing. The lens unit B1 is configured as a fixed lens unit Bfix that is fixed during image stabilizing.

The fixed lens unit Bfix includes a positive lens and a negative lens. Thereby, the longitudinal chromatic aberration that would otherwise occur in the fixed lens unit Bfix can be reduced, and it becomes easy to obtain a good optical performance.

The optical system L0 according to each of Examples 1 and 2 has a lens unit B2 and a lens unit B3 on the image side of the fixed lens unit Bfix (B1). Focusing is available between infinity and a short distance by moving the lens unit B3 in the optical axis direction. This makes it easy to reduce the diameter of the lens unit B3 that moves during focusing, and consequently the entire system can be easily made compact.

In Example 1, the second optical element M2 has a cemented lens in which a negative lens having a reflective surface formed on one surface of the lens and a positive lens are joined with each other, and particularly facilitates corrections of the longitudinal chromatic aberration and eccentric chromatic aberration during image stabilizing. In Example 2, the second optical element M2 is an aspherical mirror.

The optical system L0 according to each of Example 3 (FIG. 9) and Example 4 (FIG. 13) has a first optical element M1, a second optical element M2, and a lens unit B1. The image stabilizing unit BIS has a lens unit B1 and moves in a direction orthogonal to the optical axis during image stabilizing. A lens unit B2 is disposed between the image stabilizing unit BIS (B1) and the first optical element M1. The lens unit B2 is configured as a fixed lens unit Bfix that is fixed during image stabilizing.

The optical system L0 according to each of Examples 3 and 4 includes a lens unit B3 and a lens unit B4 on the image side of the lens unit B2. Focusing is available between infinity and a short distance by moving the lens unit B4 in the optical axis direction. This makes it easy to reduce the diameter of the lens unit B4 that moves during focusing, and consequently the entire system can be easily made compact.

The optical system L0 according to each of Example 5 (FIG. 17) and Example 6 (FIG. 21) includes a first optical element M1, a second optical element M2, and a lens unit B1. The image stabilizing unit BIS includes the second optical element M2 and the lens unit B1 and moves in the direction orthogonal to the optical axis during image stabilizing. A lens unit B2 is disposed between the image stabilizing unit BIS (M2, B1) and the first optical element M1. The lens unit B2 is configured as a fixed lens unit Bfix that is fixed during image stabilizing.

The optical system L0 according to each of Examples 5 and 6 includes the lens units B3 and B4 on the image side of the lens unit B2, similar to that of each of Examples 3 and 4. Focusing is available between infinity and a short distance by moving the lens unit B4 in the optical axis direction. This makes it easy to reduce the diameter of the lens unit B4 that moves during focusing, and consequently the entire system can be easily made compact.

The optical system L0 according to Example 7 (FIG. 25) includes a first optical element M1, a second optical element M2, and a lens unit B1. The image stabilizing unit BIS has the second optical element M2, and rotates at a minute angle around a point on the optical axis during image stabilizing. The rotational center at this time is at a position on the optical axis 500 mm away from the surface vertex of the second reflective surface R2 toward the image side. The lens unit B1 is configured as the fixed lens unit Bfix that is fixed during image stabilizing.

The optical system L0 according to example 7 has a lens unit B2, a lens unit B3, and a lens unit B4 on the image side of the fixed lens unit Bfix (B1). Focusing is available between infinity and short distance by moving the lens unit B3 in the optical axis direction. Thereby, the diameter of the lens unit B3 that moves during focusing can be reduced, and consequently the entire system can be easily made compact.

Next follows a description of conditions that the optical system L0 according to each example may satisfy. The optical system L0 according to each example may satisfy at least one of the conditions of the following expressions (1) to (5):

$$0.10 \leq DIS/DR1 \leq 1.00 \quad (1)$$

$$0.010 \leq |fIS/f| \leq 2.000 \quad (2)$$

$$0.05 \leq fR1/f \leq 0.80 \quad (3)$$

$$0.020 \leq |fR2/f| \leq 0.500 \quad (4)$$

$$0.10 \leq L/f \leq 0.65 \quad (5)$$

In Expression (1), DIS represents a distance on the optical axis from a surface vertex of a first reflective surface R1 to a surface vertex of an optical element closest to the object in the image stabilizing unit BIS, and DR1 is a distance on the optical axis from the surface vertex of the first reflective surface R1 to a surface vertex of the optical element closest to the object in the optical system L0. In Expression (2), fIS represents a focal length of the image stabilizing unit BIS, and f represents a focal length of the entire system.

In Expression (3), fR1 is a focal length of the first reflective surface R1. In Expression (4), fR2 represents a focal length of the second reflective surface R2. In Expression (5), L represents a distance on the optical axis from a surface vertex of an optical element closest to the object in the optical system L0 to the image plane IP. When there is no surface vertex on the optical axis, such as when the optical element has a hole, the position where the reference spherical-surface intersects the optical axis is set to the surface vertex.

Figure 30:
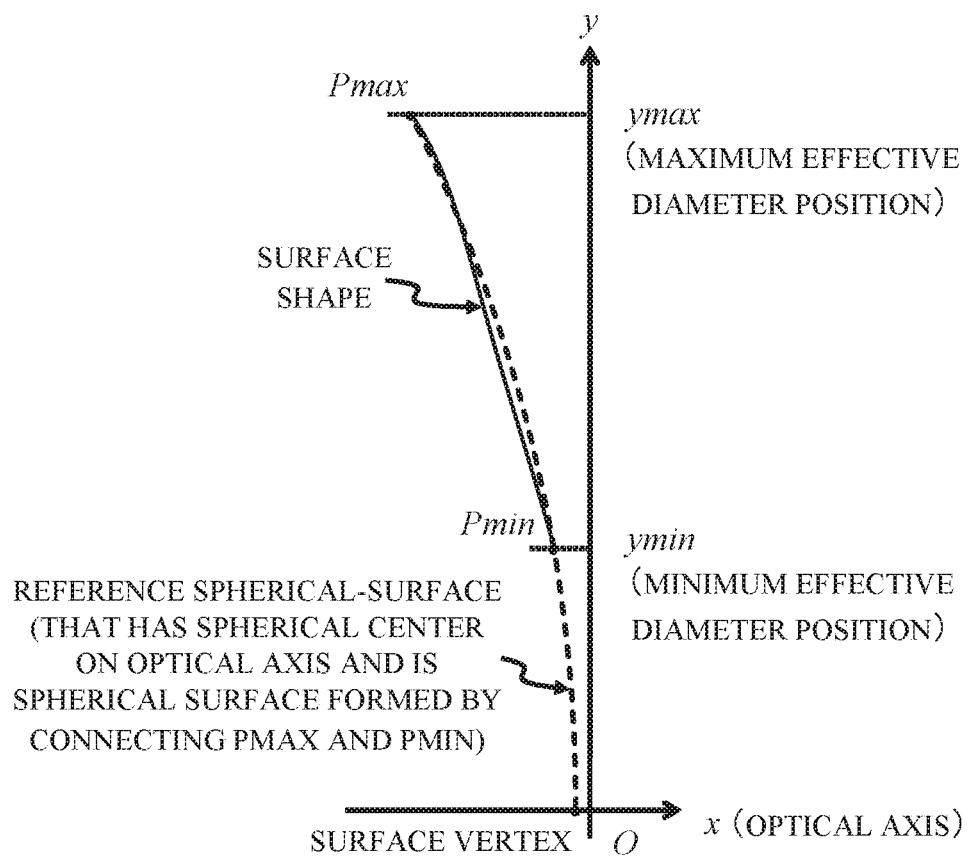
FIG. 30 illustrates a method of calculating a surface vertex position.

FIG. 30 illustrates a method of calculating the position of the surface vertex when there is no surface vertex on the optical axis. The reference spherical-surface is a spherical surface that has a spherical center is located on the optical axis and is made by connecting a spherical position Pmax corresponding to a maximum effective diameter position ymax and a spherical position Pmin corresponding to a minimum effective diameter position ymin to each other. As illustrated in this figure, the position where the reference spherical-surface intersects the optical axis is the surface vertex.

The condition of Expression (1) relates to a ratio between the distance DIS on the optical axis from the surface vertex of the first reflective surface R1 to the surface vertex of the optical element closest to the object in the image stabilizing unit BIS and the distance DR1 on the optical axis from the surface vertex of the first reflective surface R1 to the surface vertex of the optical element closest to the object in the optical system L0 the surface. If DIS/DR1 is lower than the lower limit in Expression (1), the image stabilizing unit BIS is disposed at a position where the height of the off-axis principal ray from the optical axis is high, and it becomes difficult to correct the eccentric aberration, in particular, eccentric astigmatism during image stabilizing. The DIS/DR1 cannot become higher than the upper limit in Expression (1).

The condition of Expression (2) relates to a ratio between the focal length fIS of the image stabilizing unit BIS and the focal length f of the entire system, and is a condition for maintaining a good optical performance during image stabilizing while making compact the entire system. If |fIS/f| is higher than the upper limit in Expression (2), the image stabilizing sensitivity becomes too small, a moving amount of the image stabilizing unit BIS during image stabilizing and finally the mechanism for driving the image stabilizing unit BIS become large, and it is difficult to make compact the entire system. If the power of the image stabilizing unit BIS becomes large so that |fIS/f| is lower than the lower limit in Expression (2), it becomes difficult to correct the eccentric curvature of field.

The condition of Expression (4) relates to a ratio between the focal length fR2 of the second reflective surface R2 and the focal length f of the entire system, and is a condition for achieving a good optical performance while making compact the entire system. If |fR2/f| is higher than the upper limit in Expression (4), the overall length of the optical system becomes longer. If the |fR2/f| is lower than the lower limit in Expression (4), it becomes difficult to correct the spherical aberration and curvature of field.

The condition of Expression (4) relates to a ratio between the focal length fR2 of the second reflective surface R2 and the focal length f of the entire system, and is a condition for achieving a good optical performance while making compact the entire system. If fR2/f is higher than the upper limit in Expression (4), the overall length of the optical system becomes longer. If the fR2/f is lower than the lower limit in Expression (4), it becomes difficult to correct the spherical aberration and curvature of field.

The condition of Expression (5) relates to a relationship between the focal length f of the entire system and the total length L of the optical system L0. If the overall length L becomes longer so that L/f is higher than the upper limit in Expression (5), the optical system L0 becomes large. If the overall length L becomes short so that L/f is lower than the lower limit in Expression (5), it becomes difficult to correct various aberrations, particularly the spherical aberration and curvature of field.

The numerical ranges of Expressions (1) to (5) may be changed to those of the following Expressions (1a) to (5a).

$$0.50 \leq DIS/DR1 \leq 1.00 \quad (1a)$$

$$0.015 \leq |fIS/f| \leq 1.500 \quad (2a)$$

$$0.10 \leq fR1/f \leq 0.60 \quad (3a)$$

$$0.025 \leq |fR2/f| \leq 0.350 \quad (4a)$$

$$0.15 \leq L/f \leq 0.55 \quad (5a)$$

The numerical ranges of Expressions (1) to (5) may be changed to those of the following Expressions (1b) to (5b).

$$0.80 \leq DIS/DR1 \leq 1.00 \quad (1b)$$

$$0.020 \leq |fIS/f| \leq 1.350 \quad (2b)$$

$$0.12 \leq fR1/f \leq 0.50 \quad (3b)$$

$$0.030 \leq |fR2/f| \leq 0.260 \quad (4b)$$

$$0.16 \leq L/f \leq 0.53 \quad (5b)$$

The numerical ranges of Expressions (1) to (5) may be changed to those of the following Expressions (1b) to (5b).

$$0.80 \leq DIS/DR1 \leq 1.00 \quad (1b)$$

$$0.020 \leq |fIS/f| \leq 1.350 \quad (2b)$$

$$0.12 \leq fR1/f \leq 0.50 \quad (3b)$$

$$0.030 \leq fR2/f \leq 0.260 \quad (4b)$$

$$0.16 \leq L/f \leq 0.53 \quad (5b)$$

Numerical examples 1 to 7 corresponding to Examples 1 to 7 will be shown below. In the surface data in each numerical example, a surface number i represents an i-th surface counted from the light incident side. r represents a radius of curvature (mm) of the i-th surface, d (mm) represents a lens thickness or an air gap (mm) between the i-th surface and the (i+1)-th surface, and nd represents a refractive index of a material of an i-th optical element for the d-line, vd represents an Abbe number of the material of the i-th optical element for the d-line. The Abbe number vd is expressed as vd=(Nd−1)/(NF−NC) where Nd, NE and NC are refractive indexes for the d-line (587.6 nm), the F-line (486.1 nm) and the C-line (656.3 nm) in the Fraunhofer line.

All values of d, focal length (mm), F-number, and half angle of view (°) are set when the optical system L0 in each example focuses on the object at infinity. BF represents a backfocus (mm). The backfocus is a distance on the optical axis from the final lens surface (the lens surface closest to the image plane) to the paraxial image plane in terms of the air-converted length. The "overall lens length" is a length obtained by adding the backfocus to the distance on the optical axis from the forefront surface (the lens surface closest to the object) to the final surface in the optical system L0.

A symbol * added to the surface number means that the surface is an aspherical surface. The aspherical shape is expressed as follows:

$$X=(h^2/R)/[1+\{1-(1+k)(h/R)^2\}^{1/2}]+A4\times h^4+A6\times h^6+A8\times h^8+A10\times h^{10}+A12\times h^{12}$$

where X is a displacement amount from the surface vertex in the optical axis direction, h is a height from the optical axis in the direction orthogonal to the optical axis, R is a paraxial radius of curvature, k is a conical constant, A4, A6, A8, A10, and A12 are aspherical coefficients of each order. "e±XX" in each aspherical surface coefficient means "×10^{±XX}".

Numerical Example 1

| UNIT mm | | | | |
|---|---|---|---|---|
| Surface data | | | | |
| surface number | r | d | nd | vd |
| 1 | 744.050 | 8.18 | 1.59349 | 67.0 |
| 2 | −1562.989 | 122.82 | | |
| 3 | −267.474 | 8.00 | 1.53172 | 48.8 |
| 4 | −388.775 | −8.00 | 1.53172 | 48.8 |
| 5 | −267.474 | −102.11 | | |
| 6 | −99.128 | −2.01 | 1.57099 | 50.8 |
| 7 | −40.561 | −7.20 | 1.49700 | 81.5 |
| 8 | 307.751 | −2.03 | | |
| 9 | 310.884 | −3.28 | 1.71736 | 29.5 |
| 10 | 115.046 | −3.00 | 1.61800 | 63.3 |
| 11 | −141.074 | 3.00 | 1.61800 | 63.3 |
| 12 | 115.046 | 3.28 | 1.71736 | 29.5 |
| 13 | 310.884 | 2.03 | | |
| 14 | 307.751 | 7.20 | 1.49700 | 81.5 |
| 15 | −40.561 | 2.01 | 1.57099 | 50.8 |
| 16 | −99.128 | 69.20 | | |
| 17 | 66.219 | 3.17 | 1.77250 | 49.6 |
| 18 | 273.150 | 28.62 | | |
| 19 | −80.169 | 1.99 | 1.61293 | 37.0 |
| 20 | 38.795 | 0.65 | | |
| 21 | 43.490 | 4.67 | 1.51742 | 52.4 |
| 22 | −54.675 | 9.29 | | |
| 23 | −721.497 | 2.00 | 1.49700 | 81.5 |
| 24 | 18.951 | 3.94 | 1.83481 | 42.7 |
| 25 | 23.823 | 123.44 | | |
| image plane | ∞ | | | |
| Focal length | | 1199.87 | | |
| F-NUMBER | | 10.58 | | |
| Half angle of view | | 1.03 | | |
| Image height | | 21.64 | | |
| overall lens length | | 275.87 | | |
| BF | | 123.44 | | |

Numerical Example 2

| UNIT mm | | | | |
|---|---|---|---|---|
| Surface data | | | | |
| surface number | r | d | nd | vd |
| 1 | 1158.063 | 9.46 | 1.59349 | 67.0 |
| 2 | −534.116 | 158.42 | | |
| 3 | −205.124 | 8.00 | 1.56883 | 56.4 |
| 4 | −521.889 | −8.00 | 1.56883 | 56.4 |
| 5 | −205.124 | −157.43 | | |
| 6 | −231.786 | −2.00 | 1.58913 | 61.1 |
| 7 | −71.698 | −7.82 | 1.43875 | 94.9 |
| 8 | 159.314 | −2.00 | | |
| 9* | −218.206 | 2.00 | | |
| 10 | 159.314 | 7.82 | 1.43875 | 94.9 |
| 11 | −71.698 | 2.00 | 1.58913 | 61.1 |
| 12 | −231.786 | 106.10 | | |
| 13 | 130.804 | 3.36 | 1.84666 | 23.8 |
| 14 | −402.813 | 16.72 | | |
| 15 | 36.110 | 2.92 | 1.78800 | 47.4 |
| 16 | 53.660 | 1.36 | | |
| 17 | 127.086 | 2.00 | 1.89286 | 20.4 |
| 18 | 40.503 | 34.50 | | |
| 19 | 161.926 | 2.00 | 1.77250 | 49.6 |
| 20 | 27.958 | 0.48 | | |
| 21 | 28.025 | 3.46 | 1.89286 | 20.4 |
| 22 | 34.877 | 35.68 | | |
| 23 | −28.228 | 2.36 | 1.48749 | 70.2 |
| 24 | −27.619 | 79.08 | | |
| image plane | ∞ | | | |

| ASPHERIC DATA | |
|---|---|
| ninth surface | |
| K = 0.00000e+000 A 4 = −1.63419e−008 | |
| A 6 = −2.22352e−012 A 8 = 4.72444e−015 | |
| A10 = −5.24970e−018 | |

| Focal length | 1199.87 |
|---|---|
| F-NUMBER | 10.50 |
| Half angle of view | 1.03 |
| Image height | 21.64 |
| overall lens length | 300.46 |
| BF | 79.08 |

Numerical Example 3

| UNIT mm | | | | |
|---|---|---|---|---|
| Surface data | | | | |
| surface number | r | d | nd | vd |
| 1 | 1661.829 | 9.68 | 1.59349 | 67.0 |
| 2 | −632.177 | 119.71 | | |
| 3 | −359.061 | 8.00 | 1.48749 | 70.2 |
| 4 | −506.742 | −8.00 | 1.48749 | 70.2 |
| 5 | −359.061 | −100.93 | | |
| 6 | 18089.270 | −2.50 | 1.69680 | 55.5 |
| 7 | −155.119 | −2.50 | | |
| 8 | −151.810 | −2.00 | 1.85478 | 24.8 |
| 9 | −88.163 | −6.97 | 1.64769 | 33.8 |
| 10 | −487.003 | −2.01 | | |
| 11 | −431.966 | 2.01 | | |
| 12 | −487.003 | 6.97 | 1.64769 | 33.8 |
| 13 | −88.163 | 2.00 | 1.85478 | 24.8 |

-continued

UNIT mm

| | | | | |
|---|---|---|---|---|
| 14 | −151.810 | 2.50 | | |
| 15 | −155.119 | 2.50 | 1.69680 | 55.5 |
| 16 | 18089.270 | 78.25 | | |
| 17 | 258.031 | 7.06 | 1.53172 | 48.8 |
| 18 | −106.340 | 0.50 | | |
| 19 | 264.165 | 5.63 | 1.48749 | 70.2 |
| 20 | −120.167 | 0.76 | | |
| 21 | −107.260 | 1.50 | 1.88300 | 40.8 |
| 22 | −477.622 | 42.47 | | |
| 23 | 153.934 | 2.00 | 1.88300 | 40.8 |
| 24 | 49.691 | 0.84 | | |
| 25 | 49.708 | 2.32 | 1.89286 | 20.4 |
| 26 | 70.070 | 160.57 | | |
| image plane | ∞ | | | |

| | |
|---|---|
| Focal length | 799.26 |
| F-NUMBER | 5.11 |
| Half angle of view | 1.55 |
| Image height | 21.64 |
| overall lens length | 330.36 |
| BF | 160.57 |

Numerical Example 4

UNIT mm

Surface data

| surface number | r | d | nd | vd |
|---|---|---|---|---|
| 1 | 656.300 | 8.76 | 1.59349 | 67.0 |
| 2 | −404.026 | 82.54 | | |
| 3 | −223.183 | 4.99 | 1.64000 | 60.1 |
| 4 | −364.494 | −4.99 | 1.64000 | 60.1 |
| 5 | −223.183 | −61.46 | | |
| 6 | −1876.978 | −2.50 | 1.72916 | 54.7 |
| 7 | −172.836 | −3.49 | | |
| 8 | −110.579 | −2.00 | 1.81554 | 44.4 |
| 9 | −52.040 | −6.82 | 1.73400 | 51.5 |
| 10 | −182.032 | −2.01 | | |
| 11 | −348.931 | 2.01 | | |
| 12 | −182.032 | 6.82 | 1.73400 | 51.5 |
| 13 | −52.040 | 2.00 | 1.81554 | 44.4 |
| 14 | −110.579 | 3.49 | | |
| 15 | −172.836 | 2.50 | 1.72916 | 54.7 |
| 16 | −1876.978 | 46.37 | | |
| 17 | 3772.504 | 4.27 | 1.59551 | 39.2 |
| 18 | −90.440 | 0.91 | | |
| 19 | 138.928 | 4.76 | 1.48749 | 70.2 |
| 20 | −91.345 | 1.49 | 1.88300 | 40.8 |
| 21 | −434.655 | 28.25 | | |
| 22 | 98.030 | 1.97 | 1.74100 | 52.6 |
| 23 | 44.759 | 27.36 | | |
| 24 | 43.597 | 2.35 | 1.84666 | 23.8 |
| 25 | 50.649 | 59.29 | | |
| image plane | ∞ | | | |

| | |
|---|---|
| Focal length | 399.12 |
| F-NUMBER | 3.57 |
| Half angle of view | 3.10 |
| Image height | 21.64 |
| overall lens length | 206.85 |
| BF | 59.29 |

Numerical Example 5

UNIT mm

Surface data

| surface number | r | d | nd | vd |
|---|---|---|---|---|
| 1 | 2532.342 | 9.23 | 1.59349 | 67.0 |
| 2 | −660.884 | 197.34 | | |
| 3 | −264.454 | 8.00 | 1.48749 | 70.2 |
| 4 | −515.954 | −8.00 | 1.48749 | 70.2 |
| 5 | −264.454 | −180.76 | | |
| 6 | −123.912 | −1.50 | 1.75500 | 52.3 |
| 7 | −52.414 | −5.25 | 1.53775 | 74.7 |
| 8 | 199.646 | −3.01 | | |
| 9 | 505.646 | −3.99 | 1.64000 | 60.1 |
| 10 | −230.333 | −0.83 | | |
| 11 | −147.941 | 0.83 | | |
| 12 | −230.333 | 3.99 | 1.64000 | 60.1 |
| 13 | 505.646 | 3.01 | | |
| 14 | 199.646 | 5.25 | 1.53775 | 74.7 |
| 15 | −52.414 | 1.50 | 1.75500 | 52.3 |
| 16 | −123.912 | 127.74 | | |
| 17 | 136.997 | 2.93 | 1.80400 | 46.5 |
| 18 | −370.993 | 1.98 | | |
| 19 | 25.077 | 5.60 | 1.57099 | 50.8 |
| 20 | −4527.654 | 5.49 | | |
| 21 | −207.871 | 1.97 | 1.83400 | 37.2 |
| 22 | 23.690 | 52.01 | | |
| 23 | 383.168 | 2.00 | 1.72916 | 54.7 |
| 24 | 34.110 | 6.08 | | |
| 25 | 37.379 | 2.99 | 1.84666 | 23.8 |
| 26 | 51.979 | 96.81 | | |

| | |
|---|---|
| Focal length | 1999.72 |
| F-NUMBER | 15.00 |
| Half angle of view | 0.62 |
| Image height | 21.64 |
| overall lens length | 331.40 |
| BF | 96.81 |

Numerical Example 6

UNIT mm

Surface data

| surface number | r | d | nd | vd |
|---|---|---|---|---|
| 1 | 1019.893 | 7.53 | 1.59349 | 67.0 |
| 2 | −1634.192 | 133.19 | | |
| 3 | −266.692 | 7.99 | 1.53172 | 48.8 |
| 4 | −406.304 | −7.99 | 1.53172 | 48.8 |
| 5 | −266.692 | −119.08 | | |
| 6 | −166.396 | −3.36 | 1.49700 | 81.5 |
| 7 | 1568.440 | −2.00 | | |
| 8 | 390.633 | −2.96 | 1.71736 | 29.5 |
| 9 | 193.063 | −0.34 | | |
| 10 | 221.403 | −1.99 | 1.61800 | 63.3 |
| 11 | −672.461 | −0.50 | | |
| 12 | −180.207 | 0.50 | | |
| 13 | −672.461 | 1.99 | 1.61800 | 63.3 |
| 14 | 221.403 | 0.34 | | |
| 15 | 193.063 | 2.96 | 1.71736 | 29.5 |
| 16 | 390.633 | 2.00 | | |
| 17 | 1568.440 | 3.36 | 1.49700 | 81.5 |
| 18 | −166.396 | 86.34 | | |
| 19 | 68.618 | 3.68 | 1.77250 | 49.6 |
| 20 | −386.871 | 1.30 | | |
| 21 | −67.288 | 3.02 | 1.61293 | 37.0 |
| 22 | 52.292 | 18.16 | | |
| 23 | −246.311 | 4.93 | 1.51742 | 52.4 |
| 24 | −41.607 | 9.29 | | |

Numerical Example 7 (continued)

| UNIT mm | | | | |
|---|---|---|---|---|
| 25 | 344.375 | 1.97 | 1.49700 | 81.5 |
| 26 | 21.902 | 2.94 | 1.83481 | 42.7 |
| 27 | 27.881 | 124.47 | | |
| image plane | ∞ | | | |

| Focal length | 1199.56 |
|---|---|
| F-NUMBER | 10.58 |
| Half angle of view | 1.03 |
| Image height | 21.64 |
| overall lens length | 277.75 |
| BF | 124.47 |

Numerical Example 7

| UNIT mm | | | | |
|---|---|---|---|---|
| Surface data | | | | |
| surface number | r | d | nd | vd |
| 1 | 685.590 | 15.00 | 1.51633 | 64.1 |
| 2 | −799.385 | 198.74 | | |
| 3 | −258.037 | 15.00 | 1.51633 | 64.1 |
| 4 | −704.972 | −15.00 | 1.51633 | 64.1 |
| 5 | −258.037 | −172.60 | | |
| 6 | −290.303 | −7.01 | 1.59522 | 67.7 |
| 7 | 226.643 | −0.48 | | |
| 8 | −203.474 | −8.84 | 1.49700 | 81.5 |
| 9 | 167.299 | −3.41 | 1.77250 | 49.6 |
| 10 | 2705.808 | −7.91 | | |
| 11* | −1316.722 | −2.00 | 1.65160 | 58.5 |
| 12 | −42.928 | −9.00 | 1.51633 | 64.1 |
| 13 | −282.078 | 9.00 | 1.51633 | 64.1 |
| 14 | −42.928 | 2.00 | 1.65160 | 58.5 |
| 15* | −1316.722 | 7.91 | | |
| 16 | 2705.808 | 3.41 | 1.77250 | 49.6 |
| 17 | 167.299 | 8.84 | 1.49700 | 81.5 |
| 18 | −203.474 | 0.48 | | |
| 19 | 226.643 | 7.01 | 1.59522 | 67.7 |
| 20 | −290.303 | 147.36 | | |
| 21 | 158.051 | 4.50 | 1.95375 | 32.3 |
| 22 | −233.577 | 9.51 | | |
| 23 | −110.677 | 2.50 | 1.74951 | 35.3 |
| 24 | 73.671 | 6.73 | 1.53775 | 74.7 |
| 25 | −98.478 | 6.60 | | |
| 26 | −211.170 | 3.43 | 1.88300 | 40.8 |
| 27 | −80.478 | 1.98 | 1.49700 | 81.5 |
| 28 | 45.879 | 32.10 | | |
| 29 | 187.144 | 3.41 | 1.81600 | 46.6 |
| 30 | −184.870 | 10.00 | | |
| 31 | −121.719 | 1.99 | 1.48749 | 70.2 |
| 32 | 64.133 | 80.25 | | |
| image plane | ∞ | | | |

| ASPHERIC DATA |
|---|
| eleventh surface |

$K = 0.00000e+000$ $A\,4 = -6.02757e-008$
$A\,6 = -1.43279e-011$ $A\,8 = -4.84117e-016$
$A10 = -2.17281e-018$ fifteenth surface $K = 0.00000e+000$ $A\,4 = -6.02757e-008$
$A\,6 = -1.43279e-011$ $A\,8 = -4.84117e-016$
$A10 = -2.17281e-018$

| Focal length | 1199.64 |
|---|---|
| F-NUMBER | 7.64 |
| Half angle of view | 1.03 |
| Image height | 21.64 |
| overall lens length | 351.51 |
| BF | 80.25 |

Table 1 below summarizes the values of Expressions (1) to (5) in each numerical example.

TABLE 1

| | | | Example | | | | | | |
|---|---|---|---|---|---|---|---|---|---|
| | | | 1 | 2 | 3 | 4 | 5 | 6 | 7 |
| Conditional | (1) | D|S/DR1 | 0.9182 | 1.0000 | 0.8945 | 0.8440 | 0.9477 | 0.9294 | 0.9891 |
| Expression | (2) | |f|S/f| | 0.0318 | 0.0909 | 0.6279 | 1.3091 | 0.0229 | 0.0560 | 0.0506 |
| | (3) | fR1/f | 0.1620 | 0.2175 | 0.3163 | 0.4566 | 0.1290 | 0.1694 | 0.2938 |
| | (4) | fR2/f | 0.0588 | 0.0909 | 0.2695 | 0.0552 | 0.0370 | 0.0751 | 0.1176 |
| | (5) | L/f | 0.2299 | 0.2504 | 0.4133 | 0.5183 | 0.1657 | 0.2315 | 0.2930 |

Figure 29:
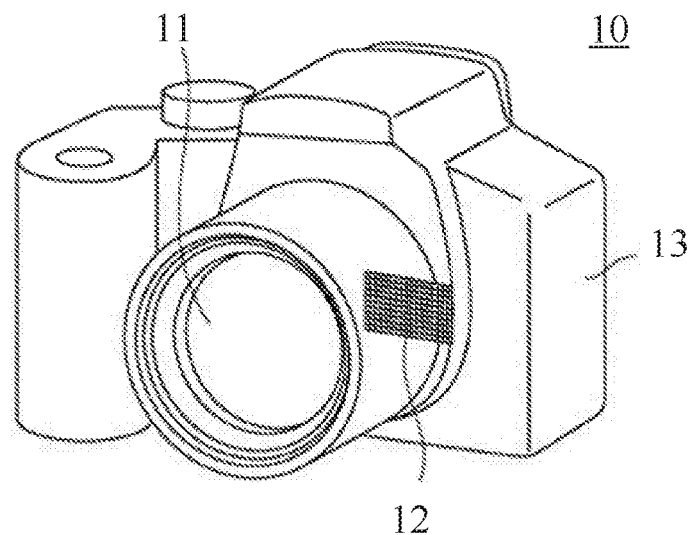
FIG. 29 is a schematic diagram of an image pickup apparatus according to Example 8.

FIG. 29 illustrates a configuration of an image pickup apparatus (digital still camera) 10 as an optical apparatus according to Example 8 using the optical system L0 according to each of the above examples for an imaging optical system. The camera 10 has an imaging optical system 11 configured by the optical system L0 according to any one of Examples 1 to 7. The camera 10 has an image sensor (light receiving element) 12 such as a CCD sensor or a CMOS sensor that receives an optical image formed by the imaging optical system 11 and photoelectrically converts it. The camera 10 may be a single lens reflex camera having a quick turn mirror or a mirrorless camera having no quick turn mirror.

Applying the optical system L0 according to each of Examples 1 to 7 to the imaging optical system 11 of the camera 10 can provide a compact and lightweight camera having a good optical performance. When the camera 10 is an interchangeable lens type, the imaging optical system 11 may be used for an interchangeable lens (optical apparatus).

Each of the above examples can realize a compact optical system that can provide a large image stabilizing amount, and a good optical performance even during image stabilizing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-202420, filed on Nov. 7, 2019, which is hereby incorporated by reference herein in its entirety.

What is claimed is:

1. An optical system comprising:
   a first optical element having a first reflective surface concave toward an object side;
   a second optical element having a second reflective surface convex toward an image side; and
   a lens unit disposed between the first optical element and the second optical element,
   wherein light from an object travels to an image plane through the first reflective surface and the second reflective surface in this order,
   wherein a movable unit configured to move during image stabilizing consists of the lens unit,
   wherein the optical system further comprises a fixed lens unit disposed between the movable unit and the first optical element and fixed during image stabilizing, and
   wherein the movable unit includes a positive lens, and the fixed lens unit includes a negative lens.

2. The optical system according to claim 1, wherein the following inequality is satisfied:

$$0.10 \leq DIS/DR1 \leq 1.00$$

where DIS is a distance on an optical axis from the first reflective surface to an optical surface closest to the object in the movable unit, and DR1 is a distance on the optical axis from the first reflective surface to an optical surface closest to the object in the optical system.

3. The optical system according to claim 1, wherein the following inequality is satisfied:

$$0.010 \leq |fIS/f| \leq 2.000$$

where fIS is a focal length of the movable unit, and f is a focal length of the optical system.

4. The optical system according to claim 1, wherein the following inequality is satisfied:

$$0.05 \leq fR1/f \leq 0.80$$

where fR1 is a focal length of the first reflective surface R1, and f is a focal length of the optical system.

5. The optical system according to claim 1, wherein the following inequality is satisfied:

$$0.020 \leq |fR2/f| \leq 0.500$$

where fR2 is a focal length of the second reflective surface R2, and f is a focal length of the optical system.

6. An optical system comprising:
   a first optical element having a first reflective surface concave toward an object side;
   a second optical element having a second reflective surface convex toward an image side; and
   a lens unit disposed between the first optical element and the second optical element,
   wherein light from an object travels to an image plane through the first reflective surface and the second reflective surface in this order,
   wherein a movable unit configured to move during image stabilizing includes the second optical element and the lens unit,
   wherein the optical system further comprises a fixed lens unit disposed between the movable unit and the first optical element and fixed during image stabilizing,
   wherein at least one of the movable unit and the fixed lens unit includes a positive lens, and
   wherein the movable unit and the fixed lens unit include totally three lenses.

7. The optical system according to claim 6, wherein the following inequality is satisfied:

$$0.10 \leq DIS/DR1 \leq 1.00$$

where DIS is a distance on an optical axis from the first reflective surface to an optical surface closest to the object in the movable unit, and DR1 is a distance on the optical axis from the first reflective surface to an optical surface closest to the object in the optical system.

8. The optical system according to claim 6, wherein the following inequality is satisfied:

$$0.010 \leq |fIS/f| \leq 2.000$$

where fIS is a focal length of the movable unit, and f is a focal length of the optical system.

9. The optical system according to claim 6, wherein the following inequality is satisfied:

$$0.05 \leq fR1/f \leq 0.80$$

where fR1 is a focal length of the first reflective surface R1, and f is a focal length of the optical system.

10. The optical system according to claim 6, wherein the following inequality is satisfied:

$$0.020 \leq |fR2/f| \leq 0.500$$

where fR2 is a focal length of the second reflective surface R2, and f is a focal length of the optical system.

* * * * *